(12) United States Patent
Liu et al.

(10) Patent No.: US 9,215,759 B2
(45) Date of Patent: *Dec. 15, 2015

(54) METHOD FOR HEATING OBJECT USING SHEET-SHAPED HEAT AND LIGHT SOURCE

(71) Applicants: Tsinghua University, Beijing (CN); HON HAI PRECISION INDUSTRY CO., LTD., New Taipei (TW)

(72) Inventors: Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,464

(22) Filed: Apr. 30, 2014

(65) Prior Publication Data

US 2014/0231409 A1 Aug. 21, 2014

Related U.S. Application Data

(63) Continuation of application No. 13/862,670, filed on Apr. 15, 2013, now Pat. No. 8,808,049, which is a continuation of application No. 12/006,301, filed on Dec. 29, 2007, now Pat. No. 8,450,930.

(30) Foreign Application Priority Data

Oct. 10, 2007 (CN) .................. 2007 1 01238093

(51) Int. Cl.
*H05B 3/14* (2006.01)
*H05B 3/20* (2006.01)
(Continued)

(52) U.S. Cl.
CPC ... *H05B 3/10* (2013.01); *H01J 1/90* (2013.01); *H01J 29/20* (2013.01); *H01J 29/30* (2013.01);

*H01K 1/06* (2013.01); *H01K 1/14* (2013.01); *H05B 3/00* (2013.01); *H05B 3/009* (2013.01);
(Continued)

(58) Field of Classification Search
CPC ............ H01J 1/90; H01J 29/20; H01J 29/30; H01K 1/06; H01K 1/14; H05B 2203/011; H05B 2203/017; H05B 2203/032; H05B 2214/04; H05B 3/00; H05B 3/009; H05B 3/10; H05B 3/26; H05B 3/54
See application file for complete search history.

(56) References Cited

U.S. PATENT DOCUMENTS 6,250,984 B1 * 6/2001 Jin et al. ................... 445/51
8,410,676 B2 * 4/2013 Feng et al. ................. 313/315
(Continued)

FOREIGN PATENT DOCUMENTS

JP 01289087 A * 11/1989

OTHER PUBLICATIONS

Machine English translation of the abstract of JP01289087 to Ogawa et al.*

*Primary Examiner* — Sikha Roy
(74) *Attorney, Agent, or Firm* — Novak Druce Connolly Bove + Quigg LLP

(57) ABSTRACT

The present disclosure relates to a method for heating an object. A sheet-shaped heat and light source is provided. The sheet-shaped heat and light source includes a carbon nanotube film curved to form a hollow cylinder, and at least two electrodes spaced from each other, located on a surface of the hollow cylinder and electrically connected to the carbon nanotube film. An object is located in the hollow cylinder. A voltage is supplied between the at least two electrodes.

20 Claims, 7 Drawing Sheets

(51) Int. Cl.
*H01K 1/06* (2006.01)
*H05B 3/10* (2006.01)
*H01J 29/20* (2006.01)
*H01J 29/30* (2006.01)
*H01K 1/14* (2006.01)
*H05B 3/26* (2006.01)
*H01J 1/90* (2006.01)
*H05B 3/00* (2006.01)
*H05B 3/54* (2006.01)
*B82Y 99/00* (2011.01)

(52) U.S. Cl.
CPC .. *H05B 3/26* (2013.01); *H05B 3/54* (2013.01); *B82Y 99/00* (2013.01); *H05B 2203/011* (2013.01); *H05B 2203/017* (2013.01); *H05B 2203/032* (2013.01); *H05B 2214/04* (2013.01); *Y10S 977/95* (2013.01)

(56) References Cited

U.S. PATENT DOCUMENTS

| | | | |
|---|---|---|---|
| 8,450,930 B2* | 5/2013 | Liu et al. | 313/578 |
| 8,808,049 B2* | 8/2014 | Liu et al. | 445/46 |
| 2004/0051432 A1* | 3/2004 | Jiang et al. | 313/311 |
| 2009/0117434 A1* | 5/2009 | Liu et al. | 429/30 |
| 2013/0284695 A1* | 10/2013 | Feng et al. | 216/36 |

* cited by examiner

METHOD FOR HEATING OBJECT USING SHEET-SHAPED HEAT AND LIGHT SOURCE

This application is a continuation application of U.S. patent application Ser. No. 13/862,670, filed on Apr. 15, 2013, entitled "METHOD FOR MAKING SHEET-SHAPED HEAT AND LIGHT SOURCE AND METHOD FOR HEATING OBJECT USING THE SAME," which is a continuation application of U.S. patent application Ser. No. 12/006,301, filed on Dec. 29, 2007, entitled "SHEET-SHAPED HEAT AND LIGHT SOURCE, METHOD FOR MAKING THE SAME AND METHOD FOR HEATING OBJECT ADOPTING THE SAME," which claims all benefits accruing under 35 U.S.C. §119 from China Patent Applications No. 200710123809.3, filed on Oct. 10, 2007, in the China Intellectual Property Office, the contents of which are hereby incorporated by reference.

BACKGROUND

1. Technical Field

The disclosure generally relates to sheet-shaped heat and light sources, methods for making the same and methods for heating objects adopting the same and, particularly, to a carbon nanotube based sheet-shaped heat and light source, a method for making the same and a method for heating objects adopting the same.

2. Discussion of Related Art

Carbon nanotubes (CNT) are a novel carbonaceous material and have received a great deal of interest since the early 1990s. It was reported in an article by Sumio Iijima, entitled "Helical Microtubules of Graphitic Carbon" (Nature, Vol. 354, Nov. 7, 1991, pp. 56-58). CNTs are conductors, chemically stable, and capable of having a very small diameter (much less than 100 nanometers) and large aspect ratios (length/diameter). Due to these and other properties, it has been suggested that CNTs should play an important role in various fields, such as field emission devices, new optic materials, sensors, soft ferromagnetic materials, etc. Moreover, due to CNTs having excellent electrical conductivity, thermal stability, and light emitting property similar to black/blackbody radiation, carbon nanotubes can also, advantageously, be used in the field of heat and light sources.

A carbon nanotube yarn drawn from an array of carbon nanotubes and affixed with two electrodes, emits light, when a voltage is applied across the electrodes. The electrical resistance of the carbon nanotube yarn does not increase as much, as metallic light filaments, with increasing temperature. Accordingly, power consumption, of the carbon nanotube yarn, is low at incandescent operating temperatures. However, carbon nanotube yarn is a linear heat and light source, and therefore, difficult to use in a sheet-shaped heat and light source.

Non-linear sheet-shaped heat and light source, generally, includes a quartz glass shell, two or more tungsten filaments or at least one tungsten sheet, a supporting ring, sealing parts, and a base. Two ends of each tungsten filament are connected to the supporting ring. In order to form a planar light emitting surface, the at least two tungsten filaments are disposed parallel to each other. The supporting ring is connected to the sealing parts. The supporting ring and the sealing parts are disposed on the base, thereby, defining a closed space. An inert gas is allowed into the closed space to prevent oxidation of the tungsten filaments. However, they are problems with the sheet-shaped heat and light source: Firstly, because tungsten filaments/sheets are grey-body radiation emitters, the temperature of tungsten filaments/sheets increases slowly, thus, they have a low efficiency of heat radiation. As such, distance of heat radiation transmission is relatively small. Secondly, heat radiation and light radiation are not uniform. Thirdly, tungsten filaments/sheets are difficult to process. Further, during light emission, the tungsten filaments/sheets maybe need a protective work environment.

What is needed, therefore, is a sheet-shaped heat and light source having a large area, uniform heat and light radiation, a method for making the same being simple and easy to be applied, and a method for heating an object adopting the same.

SUMMARY

A sheet-shaped heat and light source includes a first electrode, a second electrode, and a carbon nanotube film. The first electrode and the second electrode are separately disposed on the carbon nanotube film at a certain distance and electrically connected thereto. The carbon nanotube film includes a plurality of carbon nanotubes isotropically arranged, arranged along a fixed direction, or arranged along different directions.

Other advantages and novel features of the present sheet-shaped heat and light source, the method for making the same, and a method for heating object adopting the same will become more apparent from the following detailed description of present embodiments when taken in conjunction with the accompanying drawings.

BRIEF DESCRIPTION OF THE DRAWINGS

Many aspects of the present sheet-shaped heat and light source, the method for making the same, and a method for heating object adopting the same can be better understood with reference to the following drawings. The components in the drawings are not necessarily to scale, the emphasis instead being placed upon clearly illustrating the principles of the present sheet-shaped heat and light source, the method for making the same, and a method for heating an object adopting the same.

Figure 1:
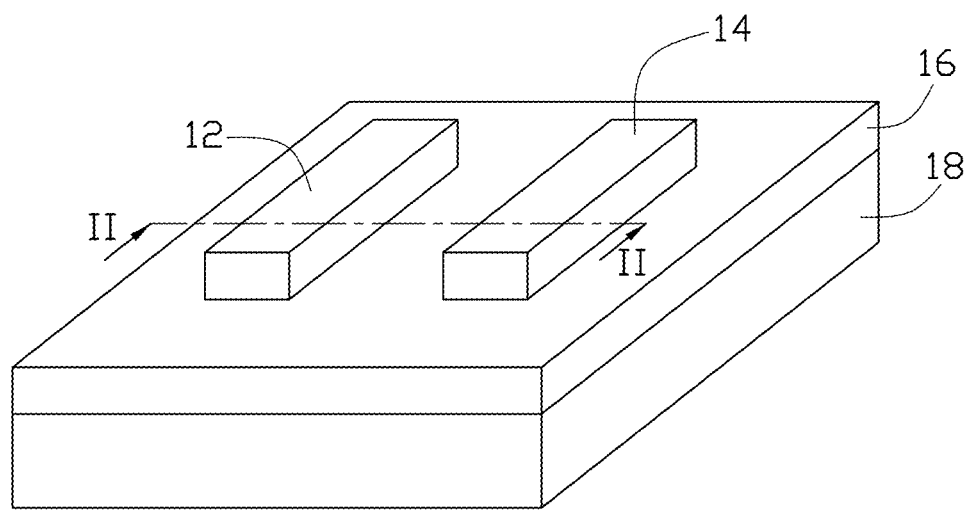
FIG. 1 is a schematic view of a sheet-shaped heat and light source, in accordance with the present embodiment.

Corresponding reference characters indicate corresponding parts throughout the several views. The exemplifications set out herein illustrate at least one present embodiment of the sheet-shaped heat and light source, the method for making the same, and a method for heating object adopting the same, in at least one form, and such exemplifications are not to be construed as limiting the scope of the disclosure in any manner.

DETAILED DESCRIPTION OF PREFERRED EMBODIMENTS

Reference will now be made to the drawings, in detail, to describe embodiments of the sheet-shaped heat and light source, the method for making the same, and a method for heating an object adopting the same.

Figure 2:
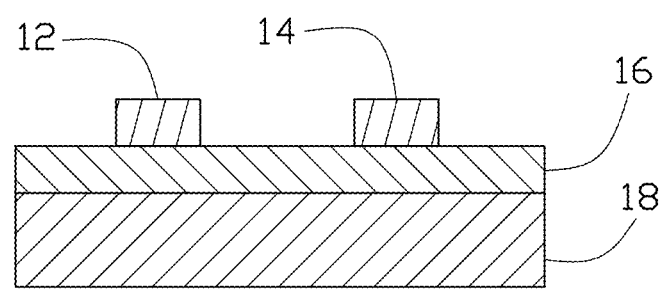
FIG. 2 is a cross-sectional schematic view of FIG. 1 along a line II-II'.

Referring to FIGS. 1 and 2, a sheet-shaped heat and light source 10 is provided in the present embodiment. The sheet-shaped heat and light source 10 includes a first electrode 12, a second electrode 14, a carbon nanotube film 16, and a base 18. The first electrode 12 and the second electrode 14 are separately disposed on the carbon nanotube film 16 at a certain distance apart and electrically connected thereto.

Further, the carbon nanotube film 16 includes a plurality of carbon nanotubes parallel arranged and orientated therein, thereby the carbon nanotubes of the carbon nanotube film 16 having a fixed orientation, that is, parallel to a surface of the carbon nanotube film 16. The carbon nanotubes are isotropically arranged along a fixed direction, or arranged along different directions. The adjacent carbon nanotubes are combined and attracted by van der Waals attractive force, thereby forming a free-standing structure. As such, the carbon nanotube film 16 has good tensile strength, and can, advantageously, be formed into most any desired shape, and so, opportunely, can have a planar or curved structure.

Length and width of the carbon nanotube film 16 is not limited. It can be made with any desired length or width according to practical needs. In the present embodiment, a thickness of the carbon nanotube film 16 is in an approximate range from 1 micrometer to 1 millimeter. In the present embodiment, the carbon nanotube film 16 is planar. The carbon nanotubes in the carbon nanotube film 16 are arranged along different directions. A length of each carbon nanotube film is about 30 centimeters. A width of each carbon nanotube film is about 30 centimeters. A thickness of each carbon nanotube film is about 50 micrometers.

It is to be understood that the carbon nanotube film 16 can, advantageously, be replaced by a carbon nanotube layer. The carbon nanotube layer can, opportunely, include many layers of carbon nanotube films overlapping each other to form an integrated carbon nanotube layer with an angle of $\alpha$, and $\alpha$ is the angle of difference between the two orientations of carbon nanotubes of the two adjacent and overlapped carbon nanotube films, $0 \le \alpha \le 90°$. The specific degree of a depends on practical needs. That is, the nanotubes of one carbon nanotube film are oriented in a same direction and the nanotubes in an adjacent and overlapped carbon nanotube film are all oriented in a direction 0-90 degrees different from the first film. The first electrode 12 and the second electrode 14 are separately disposed on the carbon nanotube layer at a certain distance, and electrically connected to the carbon nanotube layer.

Moreover, the first electrode 12 and the second electrode 14 can, opportunely, be disposed on a same surface or opposite surfaces of the carbon nanotube film 16. Further, the first electrode 12 and the second electrode 14 are separated at a certain distance to form a certain resistance therebetween, thereby preventing short circuits in use.

In the present embodiment, because of the adhesive properties of carbon nanotube film, the first electrode 12 and the second electrode 14 are directly attached to the carbon nanotube film 16, and thereby forming an electrical contact therebetween. Moreover, the first electrode 12 and the second electrode 14 are attached on the same surface of the carbon nanotube film 16 by a conductive adhesive. Quite suitably, the conductive adhesive material is silver adhesive. It should be noted that any other bonding ways can be adopted as long as the first electrode 12 and the second electrode 14 are electrically connected to the carbon nanotube film 16.

The base 18 can be ceramic, glass, resin, or quartz. The base 18 is used to support the carbon nanotube film 16. The shape of the base 18 can be determined according to practical needs. In the present embodiment, the base 18 is a ceramic substrate. Due to the carbon nanotube film 16 having a free-standing property, in practice, the sheet-shaped heat and light source 10 can, beneficially, be without the base 18.

Figure 3:
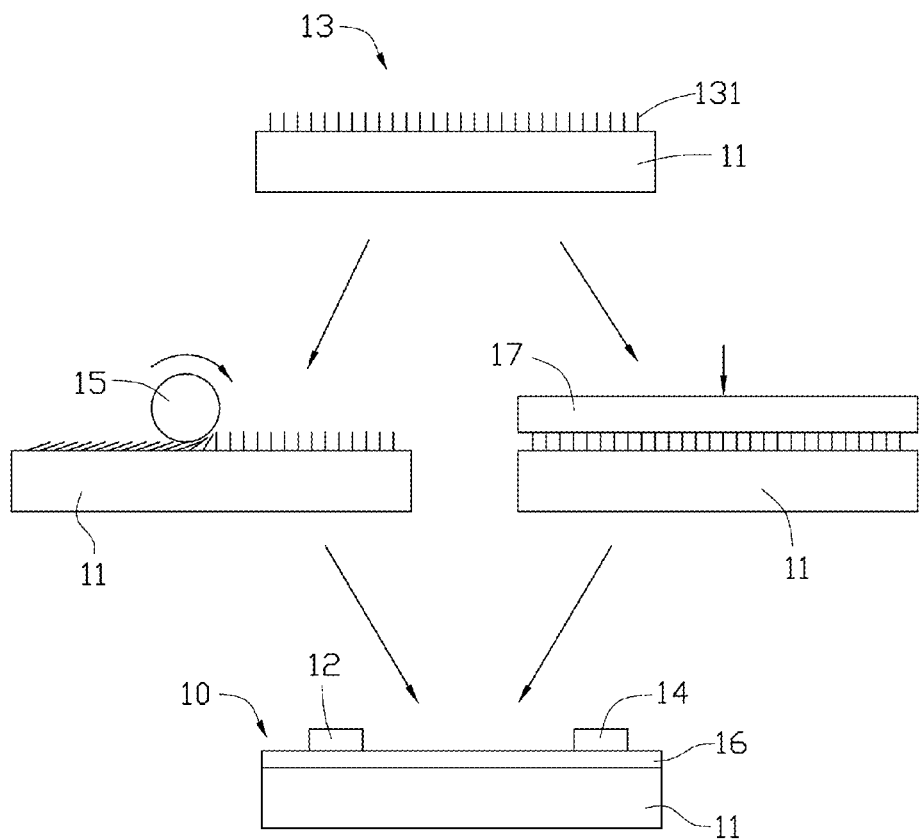
FIG. 3 is a flow chart of a method for making the sheet-shaped heat and light source shown in FIG. 1.

Referring to FIG. 3, a method for making the above-described sheet-shaped heat and light source 10 are provided in the present embodiment. The method includes the steps of: (a) providing an array 13 of carbon nanotubes formed on a substrate 11; (b) providing a pressing device to press the array 13 of carbon nanotubes, thereby forming a carbon nanotube film 16; and (c) providing a first electrode 12 and a second electrode 14 separately disposed on a same surface or opposite surfaces of the carbon nanotube film 16 and electrically connected thereto, thereby forming the sheet-shaped heat and light source 10.

In step (a), an array 13 of carbon nanotubes, quite suitably, a super-aligned array 13 of carbon nanotubes is provided. The given super-aligned array 13 of carbon nanotubes can be formed by the steps of: (a1) providing a substantially flat and smooth substrate 11; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing a super-aligned array 13 of carbon nanotubes on the substrate 11.

In step (a1), the substrate 11 can, beneficially, be a P-type silicon wafer, an N-type silicon wafer, or a silicon wafer with a film of silicon dioxide thereon. Preferably, a 4-inch P-type silicon wafer is used as the substrate 11.

In step (a2), the catalyst can, advantageously, be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array 13 of carbon nanotubes can, opportunely, have a height above 100 micrometers and include a plurality of carbon nanotubes 131 parallel to each other and approximately perpendicular to the substrate 11. Because the length of the carbon nanotubes 131 is very long, portions of the carbon nanotubes 131 are bundled together. Moreover, the super-aligned array 13 of carbon nanotubes formed under the above conditions is essentially free of impurities such as carbonaceous or residual catalyst particles. The carbon nanotubes 131 in the super-aligned array 13 are closely packed together by the van der Waals attractive force.

In step (b), a certain pressure can, beneficially, be applied to the array 13 of carbon nanotubes by the pressing device. In the process of pressing, the carbon nanotubes 131 in the array 13 of carbon nanotubes form the carbon nanotube film 16 under pressure. Quite suitably, the carbon nanotubes 131 are nearly all parallel to a surface of the carbon nanotube film 16.

Figure 4:
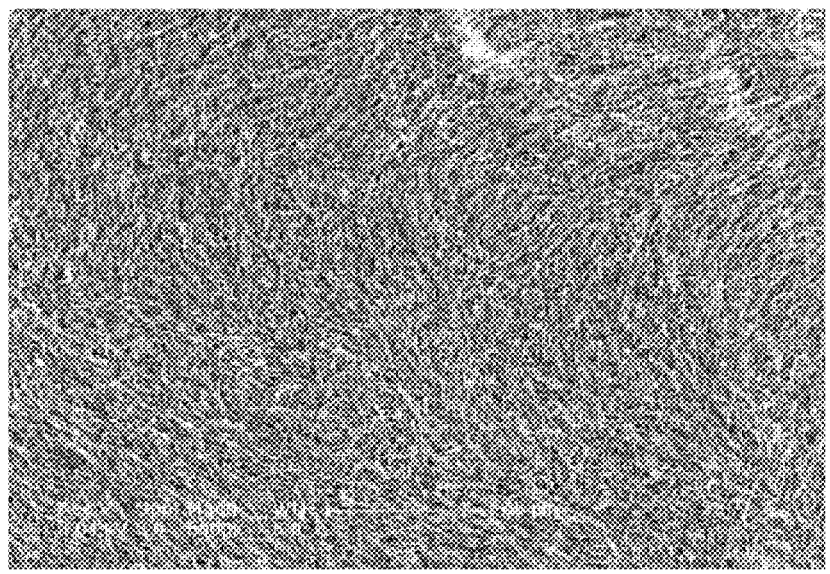
FIG. 4 shows a Scanning Electron Microscope (SEM) image of a carbon nanotube film including isotropic carbon nanotubes formed by the method of FIG. 3.
Figure 5:
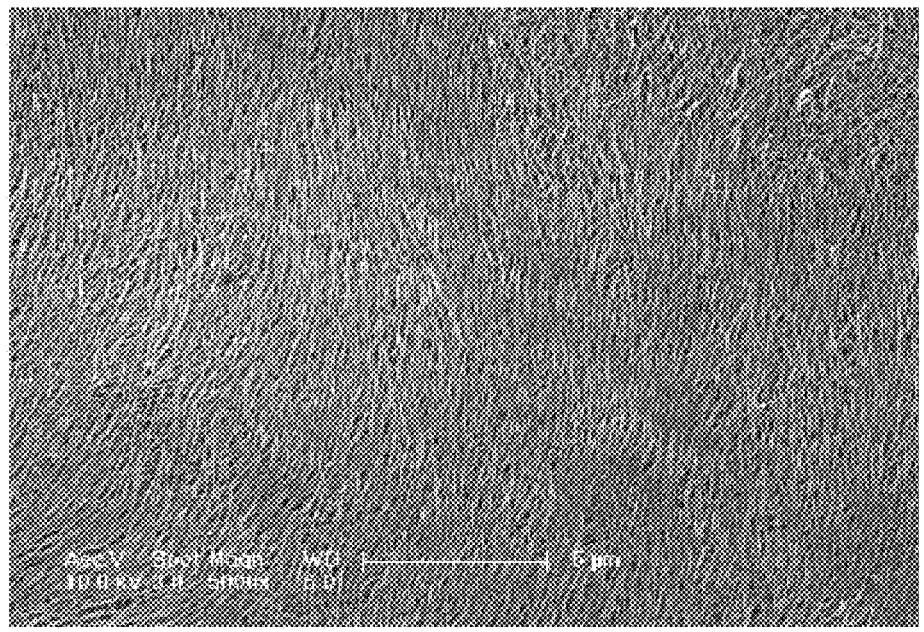
FIG. 5 shows a Scanning Electron Microscope (SEM) image of a carbon nanotube film formed by the method of FIG. 3 wherein the carbon nanotube film has a preferred orientation.

In the present embodiment, the pressing device can, advantageously, be a pressure head. The pressure head has a glossy surface. It is to be understood that, the shape of the pressure head and the pressing direction can, opportunely, determine the direction of the carbon nanotubes 131 arranged therein. Specifically, referring to FIG. 4, when a planar pressure head 17 is used to press the array 13 of carbon nanotubes along the direction perpendicular to the substrate 11, a carbon nanotube film 16 having a plurality of carbon nanotubes isotropically arranged can, advantageously, be obtained. Referring to FIG. 5, when a roller-shaped pressure head 15 is used to press the array 13 of carbon nanotubes along a fixed direction, a carbon nanotube film 16 having a plurality of carbon nanotubes 131 aligned along the fixed direction is obtained. When a roller-shaped pressure head 15 is used to press the array 13 of carbon nanotubes along different directions, a carbon nanotube film 16 having a plurality of carbon nanotubes 131 aligned along different directions is obtained.

Understandably, in the process of pressing, the carbon nanotubes 131 will, beneficially, tilt, thereby forming a carbon nanotube film 16 having a free-standing structure. The carbon nanotubes in the free-standing structure are nearly all parallel to a surface of the carbon nanotube film 16, and are isotropically arranged, arranged along a fixed direction, or arranged along different directions.

It is to be understood that, a degree of the slant of the carbon nanotubes 131 in the carbon nanotube film 16 is related to the pressure. The greater the pressure, the greater the degree of slant. A thickness of the carbon nanotube film 16 is opportunely determined by the height of the carbon nanotube array 13 and the pressure. That is, the greater the height of the carbon nanotube array 13 and the less the pressure, the larger the thickness of the carbon nanotube film 16.

Quite usefully, the carbon nanotube film 16 can be treated with an organic solvent. The organic solvent is volatilizable and can be ethanol, methanol, acetone, dichloroethane, or chloroform. Quite suitably, the organic solvent is dropped on the carbon nanotube film 16 through a dropping tube in the present embodiment. After soaking, in the organic solvent, the carbon nanotube segments in the carbon nanotube film 16 will, at least, partially be formed into carbon nanotube bundles due to the surface tension of the organic solvent. Due to the decrease of the surface area, the carbon nanotube film 16 loses viscosity but maintains high mechanical strength and toughness.

Further, the carbon nanotube film 16 can be overlapped on another array of carbon nanotubes, by repeating the step (b), thereby forming a carbon nanotube layer containing two carbon nanotube films. The two carbon nanotube films in the carbon nanotube layer are overlapped and coupled by van der Waals attractive force. As such, the carbon nanotube layer including several carbon nanotube films can, opportunely, be obtained.

It is to be noted that, the carbon nanotube films can, beneficially, be overlapped to form a carbon nanotube layer. Quite suitably, the pressing device can, opportunely, be used to press the carbon nanotube films, thereby forming the carbon nanotube layer.

In practical use, the carbon nanotube film 16 can, beneficially, be disposed on a base 18. The base 18 can be ceramic, glass, resin, or quartz. The base 18 is used to support the carbon nanotube film 16. The shape of the base 18 can be determined according to practical needs. In the present embodiment, the base 18 is a ceramic substrate. Moreover, due to the carbon nanotube film 16 having a free-standing property, in practice, the carbon nanotube film 16 can, opportunely, be used in the sheet-shaped heat and light source 10 without the base 18.

In a process of using the sheet-shaped heat and light source 10, when a voltage is applied to the first electrode 12 and the second electrode 14, the carbon nanotube film 16 of the sheet-shaped heat and light source 10 emits electromagnetic waves with a certain wavelength. Quite suitably, when the carbon nanotube film 16 of the sheet-shaped heat and light source 10 has a fixed surface area (length*width), the voltage and the thickness of the carbon nanotube film 16 can, opportunely, be used to make the carbon nanotube film 16 emit electromagnetic waves at different wavelengths. If the voltage is fixed at a certain value, the electromagnetic waves emitting from the carbon nanotube film 16 are inversely proportional to the thickness of the carbon nanotube film 16. That is, the greater the thickness of carbon nanotube film 16, the shorter the wavelength of the electromagnetic waves. Further, if the thickness of the carbon nanotube film 16 is fixed at a certain value, the greater the voltage applied to the electrode, the shorter the wavelength of the electromagnetic waves. As such, the sheet-shaped heat and light source 10, can be easily configured to emit a visible light and create general thermal radiation or emit infrared radiation.

Due to carbon nanotubes having an ideal black body structure, the carbon nanotube film 16 has excellent electrical conductivity, thermal stability, and high thermal radiation efficiency. The sheet-shaped heat and light source 10 can, advantageously, be safely exposed, while in use, to oxidizing gases in a typical environment. When a voltage of 10 volts~30 volts is applied to the electrodes, the sheet-shaped heat and light source 10 emits electromagnetic waves. At the same time, the temperature of sheet-shaped heat and light source 10 is in the approximate range from 50° C. to 500° C.

In the present embodiment, the surface area of the carbon nanotube film 16 is 900 square centimeters. Specifically, both the length and the width of the carbon nanotube film 16 are 30 centimeters. The carbon nanotube film 16 includes a plurality of carbon nanotubes isotropically arranged along a fixed direction, or arranged along different directions.

Further, quite suitably, the sheet-shaped heat and light source 10 is disposed in a vacuum device or a device with inert gas filled therein. When the voltage is increased in the approximate range from 80 volts to 150 volts, the sheet-shaped heat and light source 10 emits electromagnetic waves such as visible light (i.e. red light, yellow light etc), general thermal radiation, and ultraviolet radiation.

It is to be noted that the sheet-shaped heat and light source 10 can, beneficially, be used as electric heaters, infrared therapy devices, electric radiators, and other related devices. Moreover, the sheet-shaped heat and light source 10 can, beneficially, be used as an optical device, and thereby being used as light sources, displays, and other related devices.

Figure 6:
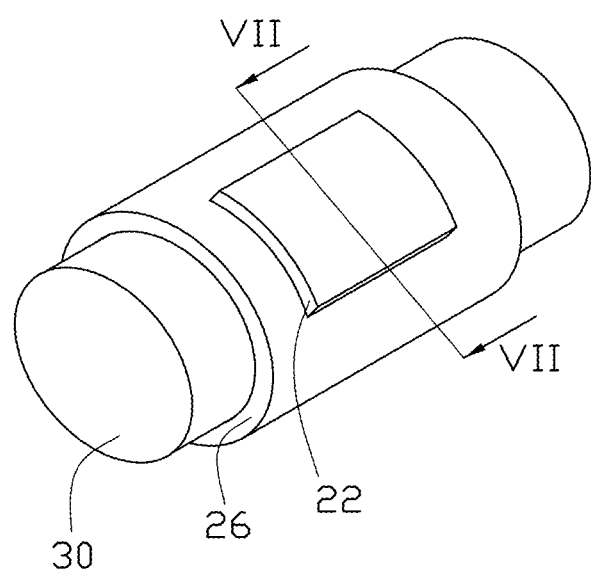
FIG. 6 is a schematic view of heating an object using the sheet-shaped heat and light source shown in FIG. 1.
Figure 7:
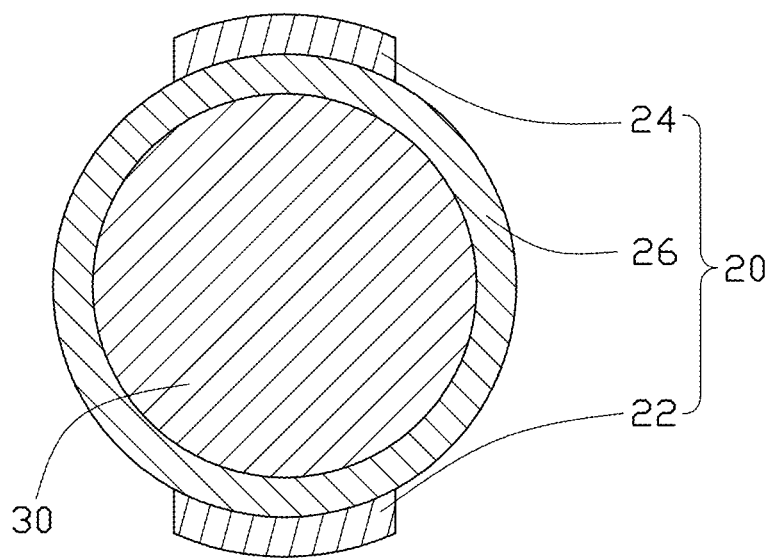
FIG. 7 is a cross-sectional schematic view of FIG. 6 along a line VII-VII'.

Referring to FIGS. 6 and 7, a method for heating an object adopting the above-described sheet-shaped heat and light source 20 is also described. In the present embodiment, the sheet-shaped heat and light source 20 includes a first electrode 22, a second electrode 24, and a carbon nanotube film 26, curved to form a hollow cylinder. Further, the first electrode 24 and the second electrode 26 are separately disposed on the carbon nanotube film 26 at a certain distance apart and electrically connected thereto.

Further, the surface area of the carbon nanotube film 26 is 900 square centimeters. Specifically, both the length and the width of the carbon nanotube film 26 are 30 centimeters. The carbon nanotube film 26 includes a plurality of carbon nanotubes isotropically arranged, arranged along a fixed direction, or arranged along different directions. The voltage applied to the electrode 12 and the electrode 14 is 15 volts. The temperature of the sheet-shaped heat and light source 10 is about 300° C.

Due to the carbon nanotube film 26 having a free-standing property, the sheet-shaped heat and light source 20 can have no base. Because the carbon nanotube film 26 has excellent tensile strength, the sheet-shaped heat and light source 10 has advantageously a ring-shaped or a hollow cylinder-shaped carbon nanotube film 26. Quite suitably, in the process of heating the object 30, the object 30 and the carbon nanotube film 26 are directly contacted with each other or apart from each other at a certain distance as required.

The method for heating an object using the sheet-shaped heat and light sources 20 includes the steps of: providing an object 30; disposing a carbon nanotubes layer 26 of the sheet-shaped heat and light source 20 to a surface of the object 30; and applying a voltage between the first electrode 22 and the second electrode 24 to heat the object 30.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for heating an object, the method comprising:
    providing a sheet-shaped heat and light source, the sheet-shaped heat and light source comprising:
        a carbon nanotube film curved to form a hollow cylinder; and
        at least two electrodes spaced from each other, located on a surface of the hollow cylinder, and electrically connected to the carbon nanotube film;
    placing an object in the hollow cylinder; and
    supplying a voltage between the at least two electrodes.

2. The method of claim 1, wherein the carbon nanotube film and the object are directly in contact with each other.

3. The method of claim 1, wherein the carbon nanotube film and the object are spaced from each other.

4. The method of claim 1, wherein the voltage applied to the at least two electrodes is in a range from about 10 volts to about 30 volts, and a temperature of the carbon nanotube film is in a range from about 50° C. to about 500° C.

5. The method of claim 4, wherein the voltage applied to the at least two electrodes is about 15 volts, and a temperature of the carbon nanotube film is about 300° C.

6. The method of claim 1, further comprising placing the carbon nanotube film in a device, wherein the device is a vacuum chamber or a chamber filled with inert gases.

7. The method of claim 6, wherein the voltage applied to the at least two electrodes is in a range from about 80 volts to about 150 volts, and the carbon nanotube film emits electromagnetic waves.

8. The method of claim 7, wherein the electromagnetic waves are selected from the group consisting of visible light, general thermal radiation, and ultraviolet radiation.

9. The method of claim 1, wherein a thickness of the carbon nanotube film is in a range from about 1 micrometer to about 1 millimeter.

10. The method of claim 1, wherein the carbon nanotube film comprises a plurality of carbon nanotubes combined by van der Waals attractive force.

11. The method of claim 10, wherein the plurality of carbon nanotubes are substantially parallel to a surface of the carbon nanotube film.

12. The method of claim 1, wherein the carbon nanotube film is a free-standing structure.

13. The method of claim 1, wherein the carbon nanotube film is square shaped.

14. The method of claim 1, wherein the at least two electrodes extend along a length direction of the hollow cylinder.

15. The method of claim 1, wherein the at least two electrodes comprises at least one of metal films and metal foils.

16. The method of claim 1, wherein the at least two electrodes are located on an outer surface of the hollow cylinder.

17. The method of claim 1, wherein the at least two electrodes are attached on the carbon nanotube film by a conductive adhesive.

18. A method for heating an object, the method comprising:
    providing a carbon nanotube film;
    curving the carbon nanotube film to form a hollow cylinder;
    electrically connecting a first electrode and a second electrode with the carbon nanotube film;
    placing an object in the hollow cylinder; and
    supplying a voltage between the at least two electrodes.

19. The method of claim 18, wherein the electrically connecting the first electrode and the second electrode with the carbon nanotube film comprises locating the first electrode and the second electrode on a surface of the hollow cylinder, and the first electrode and the second electrode are spaced from each other.

20. The method of claim 18, wherein the providing the carbon nanotube film comprises:
    providing an array of carbon nanotubes on a substrate;
    forming a carbon nanotube film by pressing the array of carbon nanotubes.

* * * * *